US011199139B2

United States Patent
Rajagopalan et al.

(10) Patent No.: US 11,199,139 B2
(45) Date of Patent: Dec. 14, 2021

(54) GAS TURBINE ENGINE SYSTEM BOWED ROTOR START MITIGATION AND WEAR REDUCTION

(71) Applicant: United Technologies Corporation, Farmington, CT (US)

(72) Inventors: Ramesh Rajagopalan, Glastonbury, CT (US); Subhradeep Chowdhury, Rocky Hill, CT (US); Stephen A Witalis, Glastonbury, CT (US); William C. Lamberti, Wethersfield, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 443 days.

(21) Appl. No.: 16/359,249

(22) Filed: Mar. 20, 2019

(65) Prior Publication Data

US 2020/0200099 A1 Jun. 25, 2020

Related U.S. Application Data

(60) Provisional application No. 62/781,744, filed on Dec. 19, 2018.

(51) Int. Cl.
*F02C 9/42* (2006.01)
*B64D 31/06* (2006.01)

(52) U.S. Cl.
CPC .............. *F02C 9/42* (2013.01); *B64D 31/06* (2013.01)

(58) Field of Classification Search
CPC ...... F02C 9/42; F02C 9/26; F02C 9/52; F02C 7/26; F02C 9/00; F02C 3/04; F02C 7/27;
(Continued)

(56) References Cited

U.S. PATENT DOCUMENTS 4,541,237 A * 9/1985 Dickey .................... F02C 9/28
60/39.281
6,253,537 B1 * 7/2001 Suenaga ................. F01D 21/06
60/39.091
(Continued)

FOREIGN PATENT DOCUMENTS

EP 3611360 A1 2/2020

OTHER PUBLICATIONS

EP Application No. 19218339.0 Extended EP Search Report dated May 13, 2020, 6 pages.
(Continued)

*Primary Examiner* — Bhavesh V Amin
(74) *Attorney, Agent, or Firm* — Cantor Colburn LLP

(57) ABSTRACT

An engine system for an aircraft includes a first gas turbine engine, a second gas turbine engine, and a control system. The control system is configured to operate the first gas turbine engine with an idle fuel burn schedule in a taxi mode of the aircraft and dry crank the second gas turbine engine in a first pre-takeoff portion of the taxi mode to cool the second gas turbine engine absent fuel burn by the second gas turbine engine. The control system operates the second gas turbine engine with a sub-idle fuel burn schedule in a second pre-takeoff portion of the taxi mode of the aircraft. The sub-idle fuel burn schedule includes a reduction of the idle fuel burn schedule. A fuel flow of the first gas turbine engine and the second gas turbine engine is increased above the idle fuel burn schedule prior to takeoff of the aircraft.

20 Claims, 4 Drawing Sheets

(58) Field of Classification Search
CPC .. F02C 7/277; F02C 6/20; F02C 7/268; F02C 9/28; F02C 3/107; F02C 7/06; F02C 7/22; F02C 7/262; F02C 7/275; F02C 9/20; F02C 7/32; F02C 6/14; F02C 7/12; F02C 6/04; F02C 7/18; F02C 9/46; B64D 31/06; B64D 41/00; B64D 27/10; B64D 27/02; B64D 27/12; B64D 27/16; B64D 31/00; B64D 31/12; B64D 45/00; B64D 27/18; F05D 2260/85; F05D 2270/071; F05D 2260/941; F01D 19/02; F01D 25/34; F01D 15/08; F01D 15/10; F01D 25/24; F01D 25/36; F01D 21/00; F01D 21/06; F01D 5/02; F01D 15/12; F01D 19/00; F01D 11/08; F01D 21/08; F01D 25/16; F01D 25/18; F01D 25/20; F01D 5/12; B64C 13/38; B64C 15/00; B64C 27/14; B64F 1/34; B64F 1/36; F01K 13/00; F02K 3/04; F02K 3/06; G05B 15/02; G06G 7/70; H02K 7/14; H02P 1/04; H02P 9/00; F01M 1/02; F02N 5/02; F03G 1/00; F04D 29/52; F04D 29/66; F16C 1/02; F16D 23/02; F16D 41/00; F16D 43/04; F16D 43/14; F16D 43/30; G01B 21/16; G01H 1/00; H01L 35/30; H02N 2/10
See application file for complete search history.

(56) References Cited

U.S. PATENT DOCUMENTS

| | | | | |
|---|---|---|---|---|
| 7,980,509 B2 * | 7/2011 | Bhargava | ............ | B64C 25/405 244/50 |
| 8,820,046 B2 * | 9/2014 | Ross | ............ | F01D 25/34 60/39.13 |
| 8,955,334 B2 | 2/2015 | Hansen et al. | | |
| 9,664,070 B1 * | 5/2017 | Clauson | ............ | F02C 7/275 |
| 10,040,577 B2 * | 8/2018 | Teicholz | ............ | B64F 1/34 |
| 10,125,636 B2 * | 11/2018 | Dube | ............ | F02C 9/00 |
| 10,125,691 B2 * | 11/2018 | Feulner | ............ | F02C 7/18 |
| 10,174,678 B2 * | 1/2019 | Schwarz | ............ | F02C 7/268 |
| 10,208,629 B2 * | 2/2019 | Jackowski | ............ | F01D 25/36 |
| 10,221,774 B2 | 3/2019 | Gelwan et al. | | |
| 10,358,936 B2 * | 7/2019 | Hockaday | ............ | F01D 25/34 |
| 10,436,064 B2 * | 10/2019 | Savela | ............ | F01D 19/00 |
| 10,443,507 B2 * | 10/2019 | Schwarz | ............ | F01D 21/00 |
| 10,539,079 B2 | 1/2020 | Schwarz et al. | | |
| 10,718,231 B2 * | 7/2020 | Orkiszewski | ............ | F04D 29/668 |
| 10,760,498 B2 * | 9/2020 | Cannella | ............ | F02N 5/02 |
| 10,781,754 B2 * | 9/2020 | Chiasson | ............ | F01D 21/06 |
| 10,801,371 B2 * | 10/2020 | Clauson | ............ | F02C 7/275 |
| 10,823,014 B2 * | 11/2020 | Steen | ............ | F01D 25/36 |
| 11,015,659 B2 * | 5/2021 | Sethi | ............ | F16D 41/00 |
| 11,073,086 B2 * | 7/2021 | Brown | ............ | F02C 9/00 |
| 2008/0190094 A1 * | 8/2008 | Kauf | ............ | F01D 25/34 60/39.182 |
| 2013/0031912 A1 * | 2/2013 | Finney | ............ | F02C 7/277 60/778 |
| 2014/0145863 A1 | 5/2014 | Cottet et al. | | |
| 2014/0373553 A1 * | 12/2014 | Zaccaria | ............ | F02C 7/268 60/778 |
| 2015/0244296 A1 | 8/2015 | Edwards | | |
| 2017/0009662 A1 | 1/2017 | Corpron | | |
| 2017/0369180 A1 | 12/2017 | Jones et al. | | |
| 2018/0023413 A1 | 1/2018 | Chowdhury et al. | | |
| 2018/0320600 A1 | 11/2018 | Lamarre et al. | | |
| 2018/0334963 A1 | 11/2018 | Fernholz et al. | | |
| 2020/0200127 A1 | 6/2020 | Witalis et al. | | |

OTHER PUBLICATIONS

EP Application No. 19218341.6 Extended EP Search Report dated May 15, 2020, 6 pages.

* cited by examiner

GAS TURBINE ENGINE SYSTEM BOWED ROTOR START MITIGATION AND WEAR REDUCTION

CROSS-REFERENCE TO RELATED APPLICATIONS

This patent application claims priority to U.S. Provisional Application No. 62/781,744, filed Dec. 19, 2018, which is incorporated herein by reference in its entirety.

BACKGROUND

The subject matter disclosed herein generally relates to gas turbine engines and, more particularly, to a method and an apparatus for gas turbine engine system bowed rotor start mitigation and wear reduction.

Gas turbine engines are used in numerous applications, one of which is for providing thrust to an aircraft. Gas turbine engines are typically operated while the aircraft is on the ground, such as during taxiing from a gate prior to takeoff and taxiing back to the gate after landing. Gas turbine engines are typically operated at an idle level to warm engine subsystems, operate accessory subsystems, and keep the aircraft in a ready state. In some instances, on-ground operation at idle can be for extended periods of time, particularly at busy airports. The on-ground operation at idle can result in sustained periods of non-flight fuel burn and contributes to engine wear as well as associated operating noise, tire wear, brake wear, and fuel-burn emissions.

When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components within the engine, which may result in a "bowed rotor" condition. If a gas turbine engine is in such a bowed rotor condition, it is undesirable to restart the engine. Typical approaches to reduce thermal distortion effects include waiting for a sufficiently long period of time to allow the thermal distortion to dissipate. Alternatively, active techniques can be employed to reduce thermal distortion, but such techniques can add significant delays at an airport gate or alleyway.

BRIEF DESCRIPTION

According to one embodiment, an engine system for an aircraft includes a first gas turbine engine, a second gas turbine engine, and a control system. The control system is configured to operate the first gas turbine engine with an idle fuel burn schedule in a taxi mode of the aircraft and dry crank the second gas turbine engine in a first pre-takeoff portion of the taxi mode to cool the second gas turbine engine absent fuel burn by the second gas turbine engine. The control system operates the second gas turbine engine with a sub-idle fuel burn schedule in a second pre-takeoff portion of the taxi mode of the aircraft. The sub-idle fuel burn schedule includes a reduction of the idle fuel burn schedule. A fuel flow of the first gas turbine engine and the second gas turbine engine is increased above the idle fuel burn schedule prior to takeoff of the aircraft.

In addition to one or more of the features described above or below, or as an alternative, further embodiments may include where the control system is further configured to: transition the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

In addition to one or more of the features described above or below, or as an alternative, further embodiments may include where the control system is further configured to: operate the first gas turbine engine with the sub-idle fuel burn schedule in a first post-landing portion of the taxi mode based on detecting landing of the aircraft, dry crank the first gas turbine engine in a second post-landing portion of the taxi mode to cool the first gas turbine engine absent fuel burn by the first gas turbine engine, and operate the second gas turbine engine with the idle fuel burn schedule based on detecting landing of the aircraft.

In addition to one or more of the features described above or below, or as an alternative, further embodiments may include where dry cranking is driven by one or more of: an electric motor, a pneumatic drive, and a hydraulic drive powered by one or more of: an auxiliary power unit, a battery system, an electric generator, a hydraulic source, and a pneumatic source.

In addition to one or more of the features described above or below, or as an alternative, further embodiments may include where dry crank of the second gas turbine engine is initiated prior to starting the first gas turbine engine.

In addition to one or more of the features described above or below, or as an alternative, further embodiments may include where the control system is further configured to alternate a designation of the first gas turbine engine and the second gas turbine engine between two or more gas turbine engines of the aircraft, and the control system is further configured to track a sub-idle time and/or a dry crank time of the two or more gas turbine engines and alternate the designation of the first gas turbine engine and the second gas turbine engine to substantially balance the sub-idle time and/or the dry crank time of the two or more gas turbine engines for the aircraft.

In addition to one or more of the features described above or below, or as an alternative, further embodiments may include where at least one engine bleed schedule is adjusted corresponding to the sub-idle fuel burn schedule to control a compressor work distribution during sub-idle operation, and where adjustment to the at least one engine bleed schedule increases an engine bleed flow to at least one environment control system of the aircraft during sub-idle operation.

In addition to one or more of the features described above or below, or as an alternative, further embodiments may include where dry crank is active for a dry crank time based on one or more of: a predetermined period of time, a computed period of time, and/or a comparison between sensor data and a threshold condition.

According to another embodiment, a gas turbine engine for an aircraft includes a fan section, a compressor section operably coupled to the fan section, a combustor section, a turbine section operably coupled to the compressor section, and an engine controller. The engine controller is configured to meter a fuel flow to the combustor section according to an idle fuel burn schedule in a first taxi mode of the aircraft and meter the fuel flow to the combustor section according to a sub-idle fuel burn schedule in a second taxi mode of the aircraft. The sub-idle fuel burn schedule includes a reduction of the idle fuel burn schedule. The engine controller is further configured to dry crank the gas turbine engine prior to metering the fuel flow according to the sub-idle fuel burn schedule prior to takeoff of the aircraft or dry crank the gas turbine engine after metering the fuel flow according to the sub-idle fuel burn schedule after landing of the aircraft.

In addition to one or more of the features described above or below, or as an alternative, further embodiments may include where the first taxi mode includes a taxi-to-flight-line mode prior to takeoff of the aircraft and the second taxi mode includes a taxi-to-gate mode after landing of the aircraft.

In addition to one or more of the features described above or below, or as an alternative, further embodiments may include where the first taxi mode includes a taxi-to-gate mode after landing of the aircraft and the second taxi mode includes a taxi-to-flight-line mode prior to takeoff of the aircraft.

In addition to one or more of the features described above or below, or as an alternative, further embodiments may include where the engine controller is further configured to transition from the sub-idle fuel burn schedule to the idle fuel burn schedule in a prepare-for-takeoff mode prior to acceleration for takeoff of the aircraft.

In addition to one or more of the features described above or below, or as an alternative, further embodiments may include where the engine controller is further configured to adjust at least one engine bleed schedule of the compressor section corresponding to the sub-idle fuel burn schedule to control a compressor work distribution during sub-idle operation of the gas turbine engine.

According to another embodiment, a method of gas turbine engine system control includes.

In addition to one or more of the features described above or below, or as an alternative, further embodiments may include operating a first gas turbine engine with an idle fuel burn schedule in a taxi mode of an aircraft and dry cranking a second gas turbine engine in a first pre-takeoff portion of the taxi mode to cool the second gas turbine engine absent fuel burn by the second gas turbine engine. The method also includes operating a second gas turbine engine with a sub-idle fuel burn schedule in a second pre-takeoff portion of the taxi mode of the aircraft. The sub-idle fuel burn schedule can include a reduction of the idle fuel burn schedule. The method further includes increasing a fuel flow of the first gas turbine engine and the second gas turbine engine above the idle fuel burn schedule prior to takeoff of the aircraft.

A technical effect of the apparatus, systems and methods is achieved by sequencing control of gas turbine engine system idle, dry crank, and sub-idle operation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
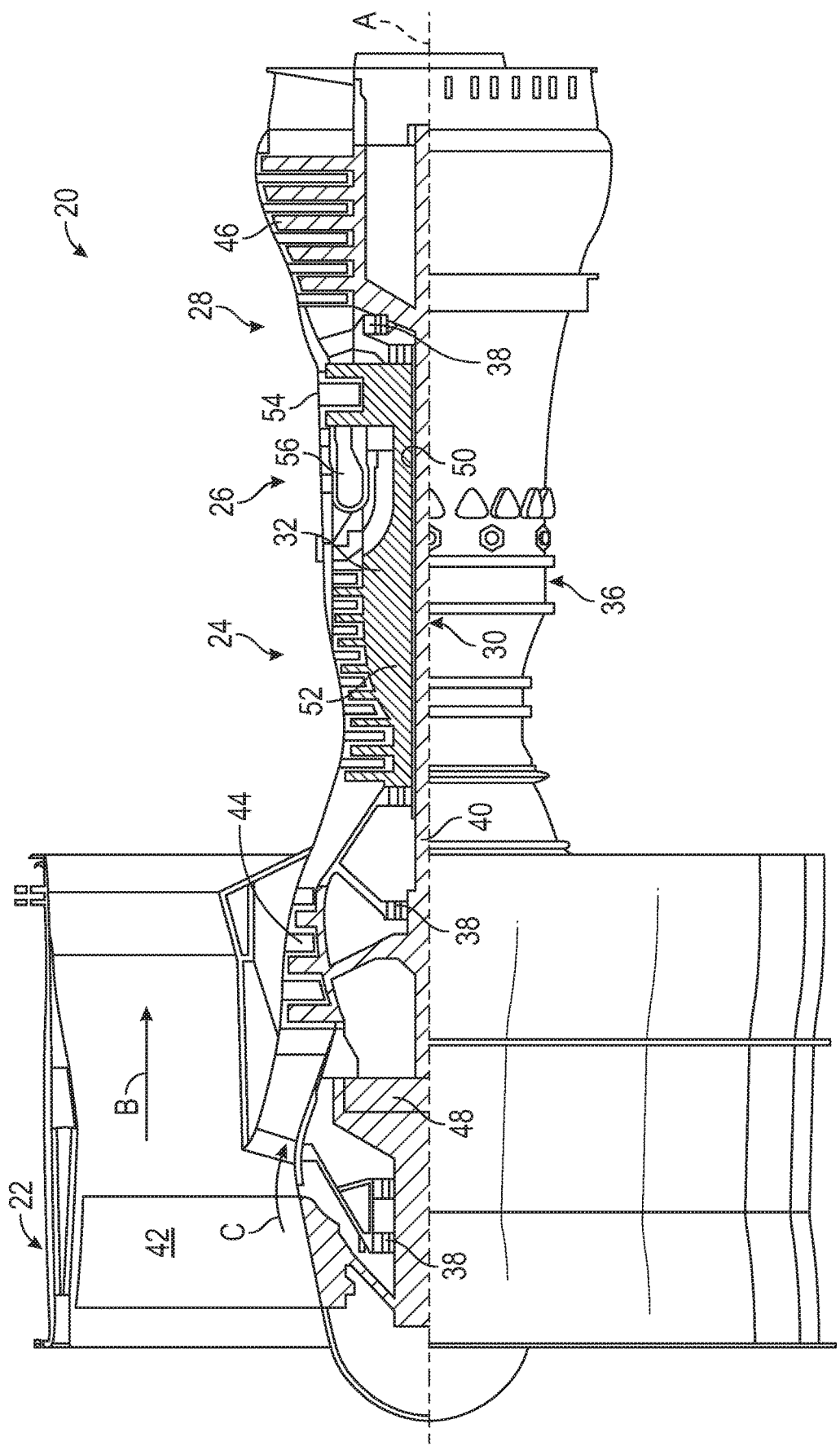
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single-spool and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (' TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications.

Figure 2:
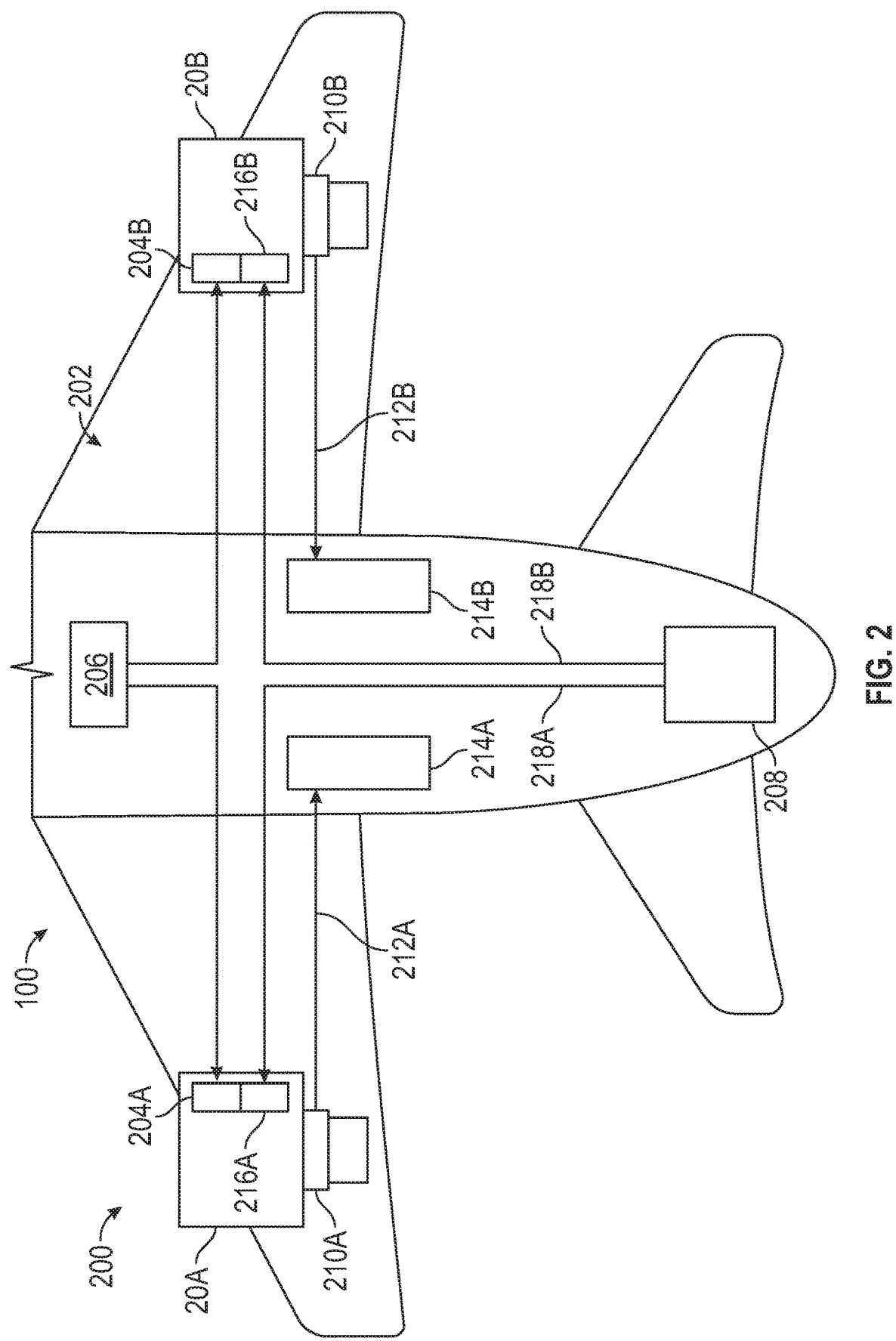
FIG. 2 is a schematic diagram of an engine system of an aircraft, in accordance with an embodiment of the disclosure.

Referring now to FIG. 2, a schematic illustration of an aircraft 100 includes an engine system 200 with first and second gas turbine engines 20A, 20B as embodiments of the gas turbine engine 20 of FIG. 1. Although the engine system 200 is depicted with two gas turbine engines 20, it will be understood that the engine system 200 can include additional gas turbine engines (e.g., three or more instances of the gas turbine engine 20 on the aircraft 100). Continuing with a two-engine example for purposes of explanation, each of the first and second gas turbine engines 20A, 20B can have an associated engine controller 204A, 204B. The engine controllers 204A, 204B can receive commands and data from an aircraft controller 206 of the aircraft 100. Collectively, the engine controllers 204A, 204B and aircraft controller 206 may be referred to as a control system 202. Control logic and command generation can be implemented by any portion of the control system 202 and may be distributed, for example, between the engine controllers 204A, 204B and/or aircraft controller 206. The aircraft controller 206 may receive pilot inputs and control multiple aspects of the aircraft 100. Examples of pilot inputs can be normal operating commands and/or override commands. For instance, a pilot can override a motoring sequence, as described herein, based on various conditions, such as, a flight delay, a return-to-gate condition, a maintenance condition, an engine shutdown condition, and other such factors. The engine controllers 204A, 204B can be embodied in one or more full authority digital engine controls (FADECs), for example.

The engine controllers 204A, 204B and aircraft controller 206 can each include memory to store instructions that are executed by one or more processors on one or more channels. The executable instructions may be stored or organized in any manner and at any level of abstraction, such as in connection with a controlling and/or monitoring operation of the first and second gas turbine engines 20A, 20B. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 2, the engine controllers 204A, 204B can meter a fuel flow to the combustor section 26 (FIG. 1) of respective gas turbine engines 20A, 20B based on a current operating mode of the aircraft 100 according to one or more fuel burn schedules. For example, the engine controllers 204A, 204B can meter a fuel flow to the combustor section 26 according to an idle fuel burn schedule in a first taxi mode of the aircraft 100 and meter the fuel flow to the combustor section 26 according to a sub-idle fuel burn schedule in a second taxi mode of the aircraft 100, where the sub-idle fuel burn schedule can be a reduction of the idle fuel burn schedule. For instance, a sub-idle fuel burn schedule may result in 50% to 80% of the nominal idle engine speed as compared to the idle fuel burn schedule. The application of the sub-idle fuel burn schedule and idle fuel burn schedule can alternate between the gas turbine engines 20A, 20B, such that at least one of the gas turbine engines 20A, 20B is operating at idle while the other is operating at sub-idle. The gas turbine engine 20A, 20B operating at a slower sub-idle speed can benefit from reduced fuel burn (resulting in reduced noise and exhaust emissions) and reduced component wear, which may extend component service life. The reduced total thrust output during taxi operations by operating at least one of the gas turbine engines 20A, 20B at sub-idle speed can also result in reduced aircraft brake wear and tire wear while increasing brake life and tire life. Alternating sub-idle operation between the gas turbine engines 20A, 20B can substantially balance the sub-idle time and associated benefits for the gas turbine engines 20A, 20B.

Sub-idle operation may be considered a significantly off-design mode of operation as compared to typical idle operation. Accordingly, sub-idle operation can cause a missmatch in compressor work distribution. One or more engine bleeds 210A, 210B of the gas turbine engines 20A, 20B can be controlled to extract an engine bleed flow 212A, 212B and increase a stability margin of the compressor section 24 (FIG. 1). The engine controllers 204A, 204B can have at least one engine bleed schedule that is adjusted corresponding to the sub-idle fuel burn schedule to control a compressor work distribution during sub-idle operation. Adjustment to the engine bleed schedules can increase the engine bleed flow 212A, 212B to at least one environment control system 214A, 214B of the aircraft 100 during sub-idle operation. For example, while gas turbine engine 20A is in sub-idle operation with the engine controller 204A using a sub-idle fuel burn schedule, the engine controller 204A can make or apply a corresponding adjustment to an engine bleed schedule that increases the engine bleed flow 212A from the engine bleed 210A to environment control system 214A that provides conditioned (e.g., heated or cooled) and pressurized air to a cabin or compartment of the aircraft 100. Similarly, when gas turbine engine 20B is in sub-idle operation with the engine controller 204B using a sub-idle fuel burn schedule, the engine controller 204B can make or apply a corresponding adjustment to an engine bleed schedule that increases the engine bleed flow 212B from the engine bleed 210B to environment control system 214B that provides conditioned and pressurized air to a cabin or compartment of the aircraft 100.

During normal operation, heating within the first and second gas turbine engines 20A, 20B can result in thermal distortion of one or more spools (e.g., low speed spool 30 and/or high speed spool 32 of FIG. 1) during engine shutdown such that on restart vibration and/or rubbing of blade tips within an engine casing can result, particularly where the rotational speed increases towards a major resonance speed (which may be referred to as a critical speed). A first dry crank drive 216A is operably coupled to the first gas turbine engine 20A, and a second dry crank drive 216B is operably coupled to the second gas turbine engine 20B. The first dry crank drive 216A provides a means for rotating a spool 30, 32 in a dry crank mode while the first gas turbine engine 20A is shutdown and the second gas turbine engine 20B of the aircraft 100 is operating. Similarly, the second dry crank drive 216B provides a means for rotating a spool 30, 32 in a dry crank mode while the second gas turbine engine 20B is shutdown and the first gas turbine engine 20A of the aircraft 100 is operating.

The first dry crank drive 216A and the second dry crank drive 216B can each include one or more of: an electric motor, a pneumatic drive, and a hydraulic drive. The first and second dry crank drive 216A, 216B may be explicitly added to each engine 20A, 20B for this purpose or adapted from an engine starter, for example. The first and second dry crank drive 216A, 216B can interface to respective engines 20A, 20B through gear trains, gearboxes, shafts, clutches, and/or other interfaces that enable the first dry crank drive 216A and the second dry crank drive 216B to control rotation of an engine core of the first and second gas turbine engines 20A, 20B below the critical speed. For instance, the first dry crank drive 216A and the second dry crank drive 216B can each be a motor that results in rotation of the first and second gas turbine engines 20A, 20B at speeds below sub-idle operation, as one example. Alternatively, the first dry crank drive 216A and the second dry crank drive 216B can each be a pneumatic starter, such as an air turbine starter, that rotates components of the first and second gas turbine engines 20A, 20B at speeds below typical starting speeds. As a further alternative, the first dry crank drive 216A and the second dry crank drive 216B can be driven to rotate by a pressurized hydraulic fluid. In the example of FIG. 2, a power source 208 is depicted as providing input power 218A, 218B to the first and second dry crank drive 216A, 216B respectively. For instance, the power source 208 can be an auxiliary power unit, a battery system, an electric generator, a hydraulic source, a pneumatic source, and/or another source of power known in the art.

Figure 3:
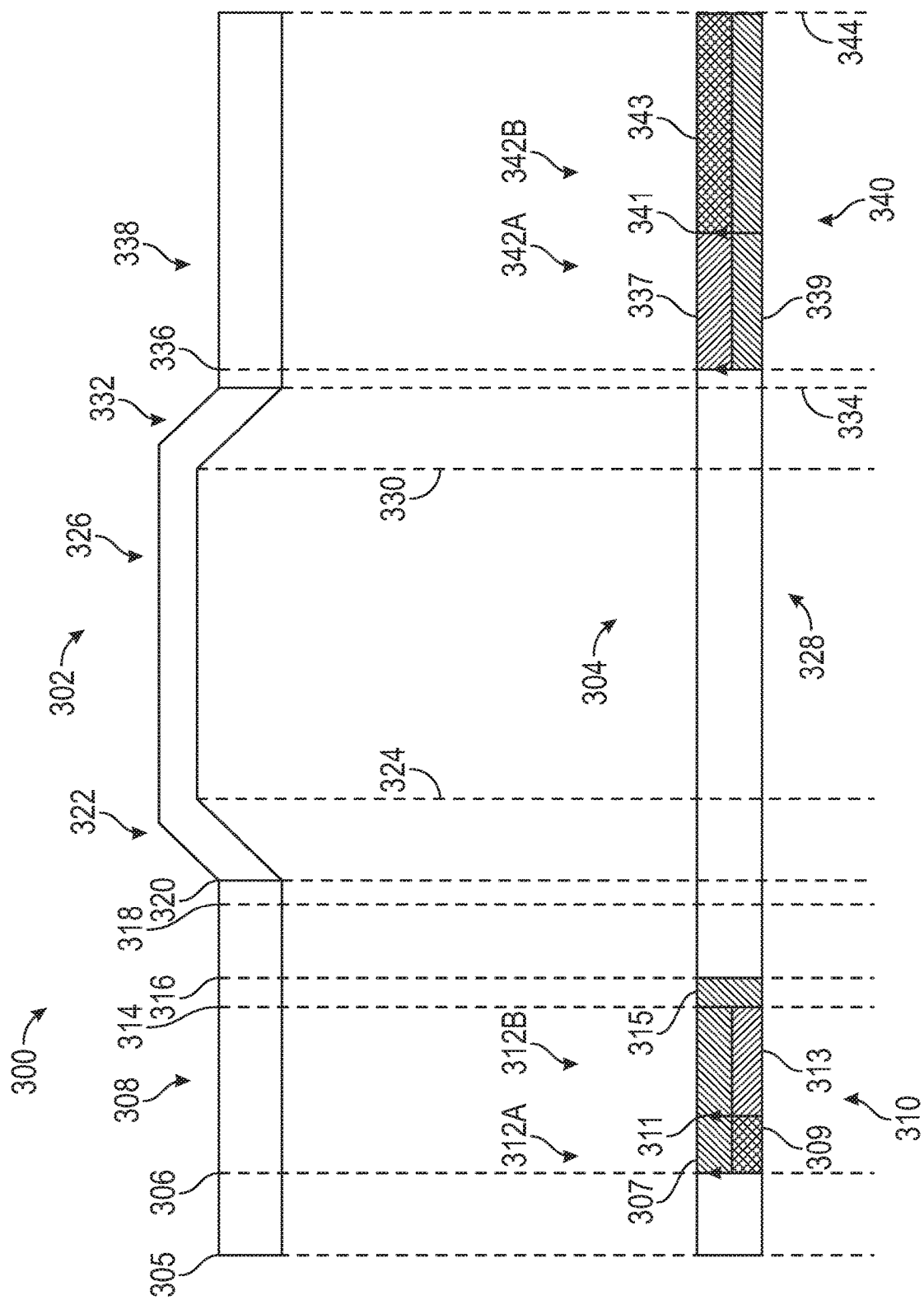
FIG. 3 is a sequence diagram for operation of an aircraft and engine system, in accordance with an embodiment of the disclosure.

FIG. 3 depicts a sequence diagram 300 for an aircraft sequence 302 and an engine system sequence 304 with further reference to FIGS. 1-2. Time progresses from left to right on FIG. 3 and is not to scale; rather, the sequence diagram 300 is a sequential illustration for purposes of explanation.

In the example of FIG. 3, a pushback event 305 of the aircraft 100 can be performed, for instance, while the engines 20A, 20B are depowered. An engine start event 306 can request starting of all engines (e.g., gas turbine engines 20A, 20B) of the aircraft 100. In the two-engine example of FIG. 2, a first gas turbine engine 20A can be configured to set an engine speed to idle operation 307 with an idle fuel burn schedule in a taxi mode of the aircraft 100 as part of a taxi-to-takeoff sequence 308 for the aircraft 100 and a taxi-to-flight-line mode 310 for the engine system 200. Rather than starting immediately upon the engine start event 306, the second gas turbine engine 20B can be configured to operate in a dry crank mode 309. In some embodiments, the dry crank mode 309 can be initiated prior to the engine start event 306. The dry crank mode 309 uses dry crank drive 216B to rotate one or more spool 30, 32 of the second gas turbine engine 20B to homogenize temperatures and mitigate a potential bowed rotor condition of the second gas turbine engine 20B prior to starting the second gas turbine engine 20B. Dry cranking of the second gas turbine engine 20B can occur in a first pre-takeoff portion 312A of the taxi mode to cool the second gas turbine engine 20B absent fuel burn by the second gas turbine engine 20B during the taxi-to-flight-line mode 310. The dry crank mode 309 can be active for a predetermined period of time, such as an expected maximum time needed to reduce a bowed rotor condition of the second gas turbine engine 20B. Alternatively, one or more computations and/or sensor data can be used to determine when to transition 311 the second gas turbine engine 20B from dry crank mode 309 to sub-idle operation 313. Computations can include, for example, bowed rotor risk parameter computations based on one or more sensed or modeled temperature values and one or more time values, e.g., a time since shutdown and/or temperature changes over time. Dry cranking may be active based on a comparison between sensor data and a threshold condition, such as sensed temperature, vibration, and/or other values indicative of a level of bowed rotor conditions.

The transition 311 can start the second gas turbine engine 20B and set an engine speed to sub-idle operation 313 with a sub-idle fuel burn schedule in the taxi mode of the aircraft 100 during the taxi-to-flight-line mode 310. In sub-idle operation 313, the second gas turbine engine 20B can operate with a sub-idle fuel burn schedule in a second pre-takeoff portion 312B of the taxi mode of the aircraft, where the sub-idle fuel burn schedule is a reduction of the idle fuel burn schedule used in idle operation 307 by the first gas turbine engine 20A. The aircraft 100 can transition to a prepare-for-takeoff mode 314 prior to acceleration 316 of the first gas turbine engine 20A and the second gas turbine engine 20B for takeoff 318 of the aircraft 100. The prepare-for-takeoff mode 314 can be reached, for example, when the aircraft 100 nears a takeoff position on or near a runway and can include transitioning the second gas turbine engine 20B from the sub-idle fuel burn schedule to the idle fuel burn schedule for duel engine idle operation 315. The sub-idle operation of the second gas turbine engine 20B can preheat components and reduce thermal expansion times needed for the second gas turbine engine 20B to be ready for takeoff 318.

The aircraft 100 can start to climb 320 and progress through a climb phase 322, transition 324 to a cruise phase 326 with the gas turbine engines 20A, 20B at cruise power 328, transition 330 to a descend phase 332, and transition 334 to a taxi-to-gate phase 338 on the ground. Based on detecting landing 336 of the aircraft 100 (e.g., detecting weight-on-wheels), the gas turbine engines 20A, 20B can be set to an opposite state as at the engine start event 306. For example, the first gas turbine engine 20A can be operated with the sub-idle fuel burn schedule for sub-idle operation 337 based on detecting landing 336 of the aircraft 100, and the second gas turbine engine 20B can be operated with the idle fuel burn schedule for idle operation 339 based on detecting landing 336 of the aircraft 100. The first and second gas turbine engines 20A, 20B can maintain different fuel flow schedules in a taxi-to-gate mode 340 after landing 336 of the aircraft 100. To further cool the first gas turbine engine 20A and reduce the risk of a bowed rotor condition occurring in the first gas turbine engine 20A, a transition 341 can occur during the taxi-to-gate mode 340 between sub-idle operation 337 and a dry crank mode 343 of the first gas turbine engine 20A. Thus, the first gas turbine engine 20A can operate with the sub-idle fuel burn schedule in a first post-landing portion 342A of the taxi mode based on detecting landing of the aircraft 100, and the first gas turbine engine 20A can dry crank in a second post-landing portion 342B of the taxi mode to cool the first gas turbine engine 20A absent fuel burn by the first gas turbine engine 20A. The dry crank mode 343 can use dry crank drive 216A to rotate one or more spool 30, 32 of the first gas turbine engine 20A to homogenize temperatures and mitigate a potential bowed rotor condition of the first gas turbine engine 20A prior to shutdown 344 of the first gas turbine engine 20A. The dry crank mode 343 can be active for a predetermined period of time, such as an expected maximum time needed to reduce a potential bowed rotor condition of the first gas turbine engine 20A. Alternatively, one or more computations and/or sensor data can be used to determine when to transition 341 the first gas turbine engine 20A from sub-idle operation 337 to dry crank mode 343. For instance, an expected time in the taxi-to-gate mode 340 can be used to determine when the transition 341 should occur, where a greater time in the sub-idle operation 337 can reduce an amount of time needed in the dry crank mode 343 to prevent or reduce a potential bowed rotor condition.

In the example of FIG. 3, the taxi-to-flight-line mode 310 is an example of a first taxi mode of the aircraft 100 and the taxi-to-gate mode 340 is example of a second taxi mode of the aircraft 100. Alternatively, the taxi mode designations can be reversed, where the taxi-to-gate mode 340 is the first taxi mode and the taxi-to-flight-line mode 310 is the second taxi mode. Further, the designations of the first gas turbine engine 20A and the second gas turbine engine 20B can alternate between two or more gas turbine engines 20 of the aircraft 100. For instance, gas turbine engine 20A may be operated with dry cranking and the sub-idle fuel burn schedule while gas turbine engine 20B is operated with the idle fuel burn schedule during the taxi-to-flight-line mode 310, and gas turbine engine 20A may be operated with the idle fuel burn schedule while gas turbine engine 20B is operated with the sub-idle fuel burn schedule and dry cranking during taxi-to-gate mode 340. The process can be expanded to include additional pairs of gas turbine engines 20 alternating between idle and sub-idle fuel burn schedules with dry cranking (e.g., a first and third engine at idle while a second and fourth engine are dry cranked or at sub-idle in a four-engine example).

To further balance wear between gas turbine engines 20A, 20B, the control system 202 may track a dry crank time and/or sub-idle time of the two or more gas turbine engines 20A, 20B and alternate the designation of the first gas turbine engine 20A and the second gas turbine engine 20B to substantially balance the dry crank time and/or sub-idle time of the two or more gas turbine engines 20A, 20B for the aircraft 100 over multiple flights. For instance, if time spent in the taxi-to-flight-line mode 310 is substantially longer than the time spent in the taxi-to-gate mode 340, alternating designations can further balance engine wear. Alternatively, the designations of the first gas turbine engine 20A and the second gas turbine engine 20B may remain substantially fixed, e.g., always start left engine at idle and right engine with dry crank then sub-idle, then alternate upon landing 336. Table 1 further illustrates an example of how modes may alternate between a pair of engines for a series of flights. Furthermore, the mode transition sequence can change, for instance, depending on a number of engines. In a four-engine aircraft example, two inboard engines can be paired to operate in the same mode together, and two outboard engines can be paired to operate in the same mode together. Other pairing or grouping combinations are contemplated.

TABLE 1

Engine operating mode transitions

| | 1st Flight | | 2nd Flight | | 3rd Flight | |
|---|---|---|---|---|---|---|
| | Taxiing Before Takeoff | Taxiing After Landing | Taxiing Before Takeoff | Taxiing After Landing | Taxiing Before Takeoff | Taxiing After Landing |
| Eng1 | Idle | Sub-idle Dry Crank | Idle | Sub-idle Dry Crank | Idle | Sub-idle Dry Crank |
| Eng2 | Dry Crank Sub-idle | Idle | Dry Crank Sub-idle | Idle | Dry Crank Sub-idle | Idle |

Figure 4:
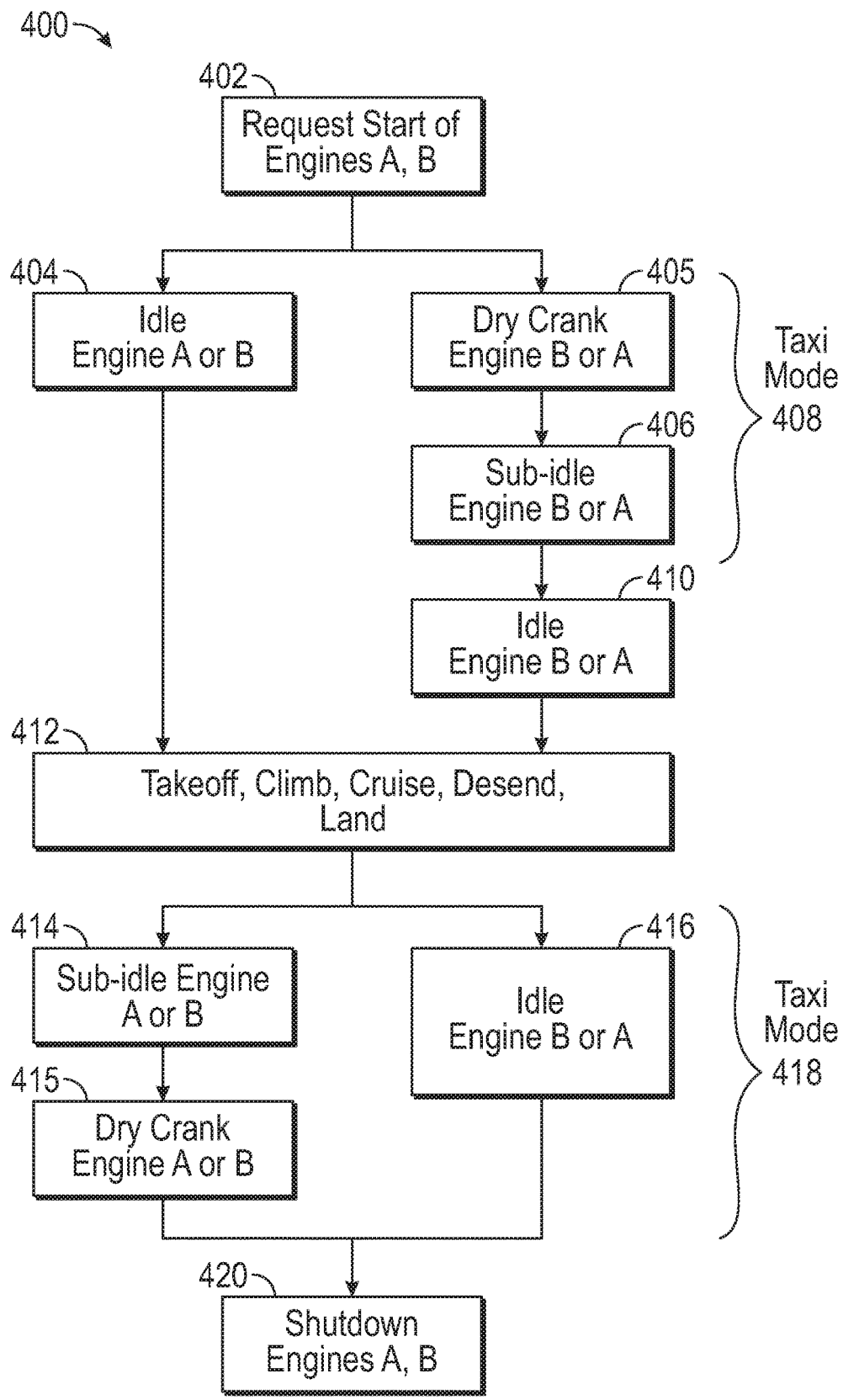
FIG. 4 is a flow chart illustrating a method, in accordance with an embodiment of the disclosure.

Referring now to FIG. 4 with continued reference to FIGS. 1-3, FIG. 4 is a flow chart illustrating a method 400 of engine system control in accordance with an embodiment. The method 400 may be performed, for example, by the engine system 200 of FIG. 2. For purposes of explanation, the method 400 is described primarily with respect to the engine system 200 of FIG. 2; however, it will be understood that the method 400 can be performed on other configurations (not depicted).

At block 402, the control system 202 can request a start the first gas turbine engine 20A and the second gas turbine engine 20B. At block 404, the control system 202 can operate the first gas turbine engine 20A with an idle fuel burn schedule in a taxi mode 408 (e.g., taxi-to-flight-line mode 310) of the aircraft 100. In parallel, at block 405, the control system 202 can dry crank the second gas turbine engine 20B to mitigate a potential bowed rotor condition before starting and operating the second gas turbine engine 20B with a sub-idle fuel burn schedule in the taxi mode of the aircraft 100 at block 406. The time in sub-idle operation can vary depending upon how much time is needed to perform dry cranking. In some instances, block 406 can be skipped, where, for example, extended dry cranking is needed. Under some operating conditions, block 405 can be skipped, where a bowed rotor condition is unlikely, e.g., a first flight of the day. The control system 202 can also adjust at least one engine bleed schedule corresponding to the sub-idle fuel burn schedule to control a compressor work distribution during sub-idle operation of the second gas turbine engine 20B.

At block 410, control system 202 can transition the second gas turbine engine 20B from the sub-idle fuel burn schedule to the idle fuel burn schedule in prepare-for-takeoff mode 314 prior to acceleration of the first gas turbine engine 20A and the second gas turbine engine 20B for takeoff 318 of the aircraft 100. The control system 202 can increase a fuel flow of the first gas turbine engine 20A and the second gas turbine engine 20B above the idle fuel burn schedule prior to takeoff 318 of the aircraft 100. At block 412, the aircraft 100 transitions through takeoff 318, a climb phase 322, a cruise phase 326, a descend phase 332, and landing 336.

At block 414, the control system 202 can operate the first gas turbine engine 20A with the sub-idle fuel burn schedule based on detecting landing 336 of the aircraft 100, followed by dry cranking of the first gas turbine engine 20A to reduce or prevent a potential bowed rotor condition at block 415. In some embodiments, sub-idling at block 414 can be omitted and method 400 can transition directly from block 412 to block 415. In other embodiments, the first gas turbine engine 20A may idle rather than sub-idle between blocks 412 and 415. Further, the first gas turbine engine 20A may idle between blocks 412 and 414. In parallel after block 412, at block 416, the control system 202 can operate the second gas turbine engine 20B with the idle fuel burn schedule based on detecting landing 336 of the aircraft 100 in taxi mode 418. The control system 202 can also adjust at least one engine bleed schedule corresponding to the sub-idle fuel burn schedule to control a compressor work distribution during sub-idle operation of the first gas turbine engine 20A, for instance, to increase an engine bleed flow 212A to at least one environment control system 214A of the aircraft 100 during sub-idle operation.

In taxi mode 418, the aircraft 100 can continue with a taxi-to-gate phase 338 on the ground, for instance, until reaching a gate or other destination. At block 420, engine shutdown 342 can depower both the first gas turbine engine 20A and the second gas turbine engine 20B.

Also, while the above description describes a process for a twin engine aircraft, a similar procedure can be applied to aircraft with more than two engines. For example, in the case of more than two engines, more than one engine (e.g., one or more additional gas turbine engine 20) may be operated at sub-idle with dry cranking during taxiing.

While the above description has described the flow process of FIG. 4 in a particular order, it should be appreciated that unless otherwise specifically required in the attached claims that the ordering of the steps may be varied. Further, the designation of the first and second gas turbine engines 20A, 20B can be arbitrary and need not map to a particular engine (e.g., left or right) as the designations can change such that at least one of the gas turbine engines 20A, 20B operates at a sub-idle speed and dry cranking during portions of taxi operations.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system for an aircraft, the engine system comprising:
   a first gas turbine engine;
   a second gas turbine engine;
   a control system configured to:
      operate the first gas turbine engine with an idle fuel burn schedule in a taxi mode of the aircraft;
      dry crank the second gas turbine engine in a first pre-takeoff portion of the taxi mode to cool the second gas turbine engine absent fuel burn by the second gas turbine engine;
      operate the second gas turbine engine with a sub-idle fuel burn schedule in a second pre-takeoff portion of the taxi mode of the aircraft, the sub-idle fuel burn schedule comprising a reduction of the idle fuel burn schedule; and
      increase a fuel flow of the first gas turbine engine and the second gas turbine engine above the idle fuel burn schedule prior to takeoff of the aircraft.

2. The engine system of claim 1, wherein the control system is further configured to:
   transition the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

3. The engine system of claim 1, wherein the control system is further configured to:
   operate the first gas turbine engine with the sub-idle fuel burn schedule in a first post-landing portion of the taxi mode based on detecting landing of the aircraft;
   dry crank the first gas turbine engine in a second post-landing portion of the taxi mode to cool the first gas turbine engine absent fuel burn by the first gas turbine engine; and
   operate the second gas turbine engine with the idle fuel burn schedule based on detecting landing of the aircraft.

4. The engine system of claim 3, wherein dry cranking is driven by one or more of: an electric motor, a pneumatic drive, and a hydraulic drive powered by one or more of: an auxiliary power unit, a battery system, an electric generator, a hydraulic source, and a pneumatic source.

5. The engine system of claim 1, wherein dry crank of the second gas turbine engine is initiated prior to starting the first gas turbine engine.

6. The engine system of claim 1, wherein the control system is further configured to alternate a designation of the first gas turbine engine and the second gas turbine engine between two or more gas turbine engines of the aircraft, and the control system is further configured to track a sub-idle time and/or a dry crank time of the two or more gas turbine engines and alternate the designation of the first gas turbine engine and the second gas turbine engine to substantially balance the sub-idle time and/or the dry crank time of the two or more gas turbine engines for the aircraft.

7. The engine system of claim 1, wherein at least one engine bleed schedule is adjusted corresponding to the sub-idle fuel burn schedule to control a compressor work distribution during sub-idle operation, and wherein adjustment to the at least one engine bleed schedule increases an engine bleed flow to at least one environment control system of the aircraft during sub-idle operation.

8. The engine system of claim 1, wherein dry crank is active for a dry crank time based on one or more of: a predetermined period of time, a computed period of time, and/or a comparison between sensor data and a threshold condition.

9. A gas turbine engine for an aircraft, the gas turbine engine comprising:
   a fan section;
   a compressor section operably coupled to the fan section;
   a combustor section;
   a turbine section operably coupled to the compressor section; and
   an engine controller configured to:
      meter a fuel flow to the combustor section according to an idle fuel burn schedule in a first taxi mode of the aircraft;
      meter the fuel flow to the combustor section according to a sub-idle fuel burn schedule in a second taxi mode of the aircraft, the sub-idle fuel burn schedule comprising a reduction of the idle fuel burn schedule; and
      dry crank the gas turbine engine prior to metering the fuel flow according to the sub-idle fuel burn schedule prior to takeoff of the aircraft or dry crank the gas turbine engine after metering the fuel flow according to the sub-idle fuel burn schedule after landing of the aircraft.

10. The gas turbine engine of claim 9, wherein the first taxi mode comprises a taxi-to-flight-line mode prior to takeoff of the aircraft and the second taxi mode comprises a taxi-to-gate mode after landing of the aircraft.

11. The gas turbine engine of claim 9, wherein the first taxi mode comprises a taxi-to-gate mode after landing of the aircraft and the second taxi mode comprises a taxi-to-flight-line mode prior to takeoff of the aircraft.

12. The gas turbine engine of claim 11, wherein the engine controller is further configured to transition from the sub-idle fuel burn schedule to the idle fuel burn schedule in a prepare-for-takeoff mode prior to acceleration for takeoff of the aircraft.

13. The gas turbine engine of claim 9, wherein the engine controller is further configured to adjust at least one engine bleed schedule of the compressor section corresponding to the sub-idle fuel burn schedule to control a compressor work distribution during sub-idle operation of the gas turbine engine.

14. A method of engine system control, the method comprising:
   operating a first gas turbine engine with an idle fuel burn schedule in a taxi mode of an aircraft;
   dry cranking a second gas turbine engine in a first pre-takeoff portion of the taxi mode to cool the second gas turbine engine absent fuel burn by the second gas turbine engine;
   operating a second gas turbine engine with a sub-idle fuel burn schedule in a second pre-takeoff portion of the taxi mode of the aircraft, the sub-idle fuel burn schedule comprising a reduction of the idle fuel burn schedule; and
   increasing a fuel flow of the first gas turbine engine and the second gas turbine engine above the idle fuel burn schedule prior to takeoff of the aircraft.

15. The method of claim 14, further comprising:
   transitioning the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

16. The method of claim 14, further comprising:
   operating the first gas turbine engine with the sub-idle fuel burn schedule in a first post-landing portion of the taxi mode based on detecting landing of the aircraft;
   dry cranking the first gas turbine engine in a second post-landing portion of the taxi mode to cool the first gas turbine engine absent fuel burn by the first gas turbine engine; and
   operating the second gas turbine engine with the idle fuel burn schedule based on detecting landing of the aircraft.

17. The method of claim 14, wherein dry crank of the second gas turbine engine is initiated prior to starting the first gas turbine engine.

18. The method of claim 14, further comprising:
   alternating a designation of the first gas turbine engine and the second gas turbine engine between two or more gas turbine engines of the aircraft; and
   tracking a sub-idle time and/or a dry crank time of the two or more gas turbine engines and alternate the designation of the first gas turbine engine and the second gas turbine engine to substantially balance the sub-idle time and/or the dry crank time of the two or more gas turbine engines for the aircraft.

19. The method of claim 14, further comprising:
   adjusting at least one engine bleed schedule corresponding to the sub-idle fuel burn schedule to control a compressor work distribution during sub-idle operation, wherein adjusting the at least one engine bleed schedule increases an engine bleed flow to at least one environment control system of the aircraft during sub-idle operation.

20. The method of claim 14, wherein dry crank is active for a dry crank time based on one or more of: a predetermined period of time, a computed period of time, and/or a comparison between sensor data and a threshold condition.

* * * * *